United States Patent [19]

Martin

[11] Patent Number: 4,740,916
[45] Date of Patent: Apr. 26, 1988

[54] RECONFIGURABLE CONTIGUOUS ADDRESS SPACE MEMORY SYSTEM INCLUDING SERIALLY CONNECTED VARIABLE CAPACITY MEMORY MODULES AND A SPLIT ADDRESS BUS

[75] Inventor: Douglas E. Martin, Round Rock, Tex.

[73] Assignee: International Business Machines Corporation, Armonk, N.Y.

[21] Appl. No.: 810,622

[22] Filed: Dec. 19, 1985

[51] Int. Cl.⁴ .................. G06F 12/02; G06F 13/40
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,469,241 | 9/1969 | Barton et al. | 340/172.5 |
| 3,803,560 | 4/1974 | DeVoy et al. | 340/172.5 |
| 4,001,790 | 1/1977 | Barlow | 340/172.5 |
| 4,025,903 | 5/1977 | Kaufman et al. | 364/200 |
| 4,037,215 | 7/1977 | Birney et al. | 364/200 |
| 4,234,934 | 11/1980 | Thorsrud | 364/900 |
| 4,254,463 | 3/1981 | Busby et al. | 364/200 |
| 4,280,176 | 7/1981 | Tan | 364/200 |
| 4,303,993 | 12/1981 | Panepinto, Jr. et al. | 365/230 |
| 4,355,376 | 10/1982 | Gould | 365/200 |
| 4,414,627 | 11/1983 | Nakamura | 364/200 |
| 4,513,368 | 4/1985 | Houseman | 364/200 |
| 4,513,372 | 4/1985 | Ziegler | 364/200 |
| 4,562,532 | 12/1985 | Nishizawa et al. | 364/200 |
| 4,571,676 | 2/1986 | Mantellina et al. | 364/200 |
| 4,654,787 | 3/1987 | Finnell et al. | 364/200 |

Primary Examiner—Raulfe B. Zache
Assistant Examiner—Eric Coleman
Attorney, Agent, or Firm—Thomas E. Tyson

[57] ABSTRACT

A memory system for providing a contiguous address space and including several memory modules each having circuitry to provide information of their respective memory module capacity to a control circuit. The control circuit allocates a start address to the first memory module and allocates start addresses to the remaining memory modules in accordance with previously allocated start addresses and the memory capacities of the memories that have received their respected start addresses. In one embodiment, the control circuit includes a series of adders each connected to a memory module to receive memory capacity data. The adders are connected in series to compute the start addresses in a daisy chain fashion.

7 Claims, 4 Drawing Sheets

RECONFIGURABLE CONTIGUOUS ADDRESS SPACE MEMORY SYSTEM INCLUDING SERIALLY CONNECTED VARIABLE CAPACITY MEMORY MODULES AND A SPLIT ADDRESS BUS

DESCRIPTION

1. Technical Field

This invention relates to computer memory systems and more specifically to a computer memory system that allocates address space among several individual memory modules to form a contiguous address space for the memory.

2. Background Art

Traditionally, computer systems have always included a memory system made up of several individual memory modules. These memory modules are connected to the central processor by an information bus that includes address lines, data lines and control signal lines. Each individual memory module is accessed by specific address signals on the address lines that designate a memory location within the memory module.

Several techniques have been used to allocate memory addresses in a memory module. One common technique is to use jumper wires or dual-in-line package switches to designate the address space for a memory module. Then, when the memory module is connected to the information bus, the memory module will respond to addresses within the designated address space. One disadvantage of this technique is that it requires a determination of the previously allocated memory addresses for previously connected memory modules in order to determine the appropriate address space for a newly added module. A further disadvantage is that increasing the size of the memory module by changing the memory chip capacity may not be possible because of the limited number of jumper wires or switches available to designate address space. Another disadvantage, is that increasing the memory capacity of the memory module itself may require a total reallocation of memory address space for other memory modules. If several memory modules are involved, this can be a very tedious task.

Another technique is disclosed in U.S. Pat. No. 4,414,627 entitled "Main Memory Control Systems". This system provides an address converting table that includes word registers addressable by logic addresses for storing the respective preassigned physical unit memory addresses for the modules and corresponding flag signals to indicate whether the units are operative. As the jumper technique, this technique requires preassignment of modules to address space.

U.S. Pat. No. 3,469,241 entitled "Data Processing Apparatus Providing Contiguous Addressing for Non-Contiguous Storage", discloses a technique wherein the data processing unit, when it is to communicate with memory, supplies a group of signals which symbolically represent addresses of memory cells. The symbolic addresses are applied to a translating device that produces the actual address of the cell being accessed Again this technique requires the preassignment of address space.

SUMMARY OF THE INVENTION

In accordance with the present invention, a memory system for providing a contiguous address space is disclosed which includes several memory modules where each memory module includes circuitry for providing the memory module capacity. A control circuit is included for allocating a start address to a first one of the modules and allocating start addresses to each of the remaining modules in accordance with prior allocated start addresses and prior allocated module memory capacities.

In one embodiment of the present invention, several memory cards are connected to an information bus. The processor provides a start address to the first serially located memory card. Each memory card includes a circuit to provide that respective memory card's memory capacity and a control circuit to receive the start address, and add the card's memory capacity to produce a next card address which is provided to the next serially located memory card. Each memory card after receiving a start address provides the start address to the serially located next card in a daisy chain fashion. In this manner, a contiguous address space is provided.

In a second embodiment, a main memory control circuit is provided which includes several adders each connected to an individual memory module. The memory modules provide the adders with the memory capacity of each module. Each adder combines the memory capacity with the start address to provide a next address for the next serially located adder. Additionally, the memory controller includes an address compare circuit for each memory module to determine when that specific memory module is being addressed.

In a third embodiment, a memory controller as described for the second embodiment is provided. However, the lines from the memory modules to the adder are bi-directional. In a first direction, the memory capacity is provided to the memory module's respective adder. In the second direction, the low order addresses for accessing individual memory locations in each memory module are provided. The control of the direction for this bi-directional line is provided by a dedicated control signal to each memory module. The higher order address decoding is performed on the memory controller as in the second embodiment, i.e., a memory compare circuit on the memory controller provides a memory module select to each of their respective memory modules when addressed.

DESCRIPTION OF THE PREFERRED EMBODIMENTS

Figure 1:
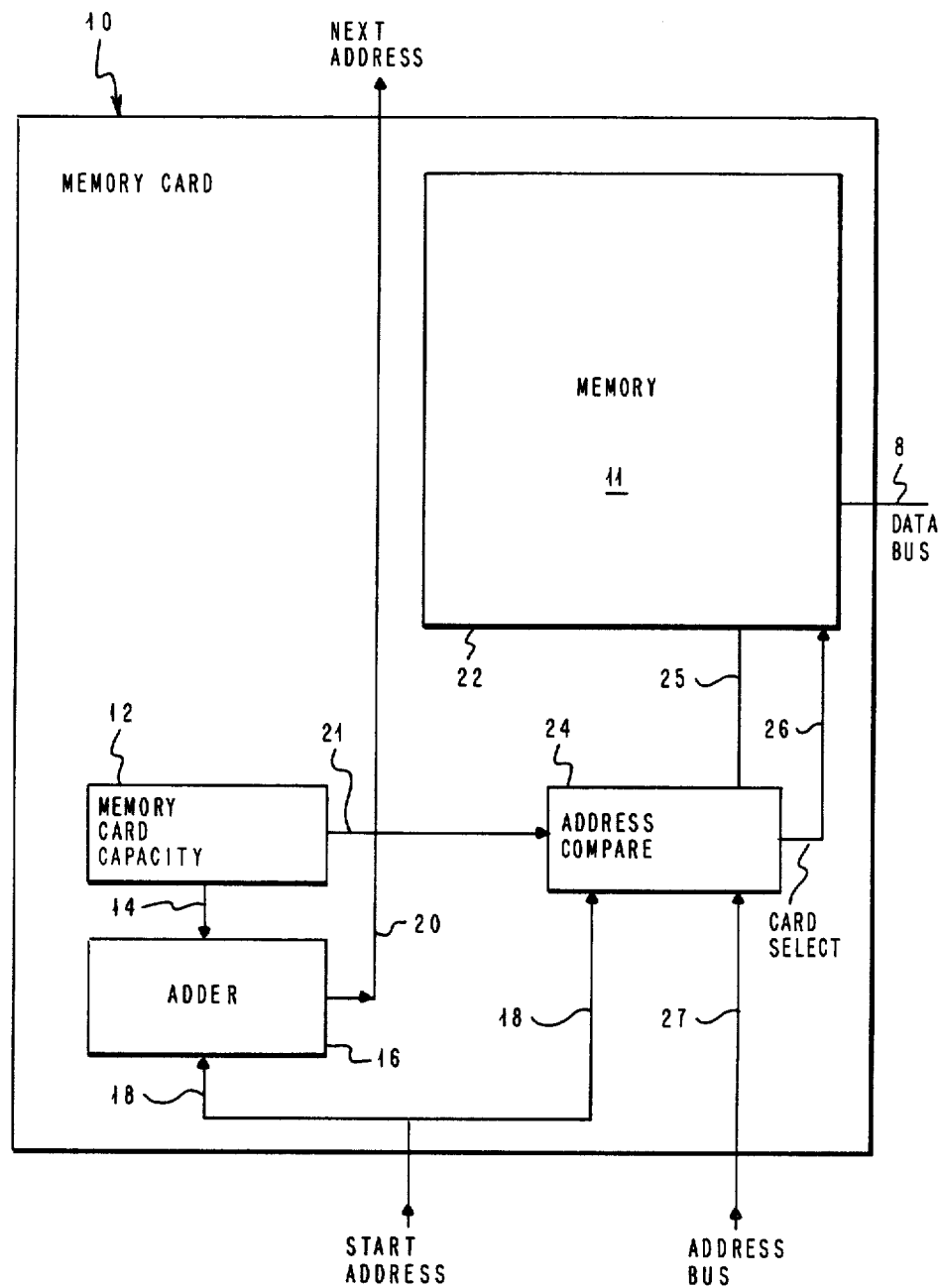
FIG. 1 is a block diagram of an individual memory card.
Figure 2:
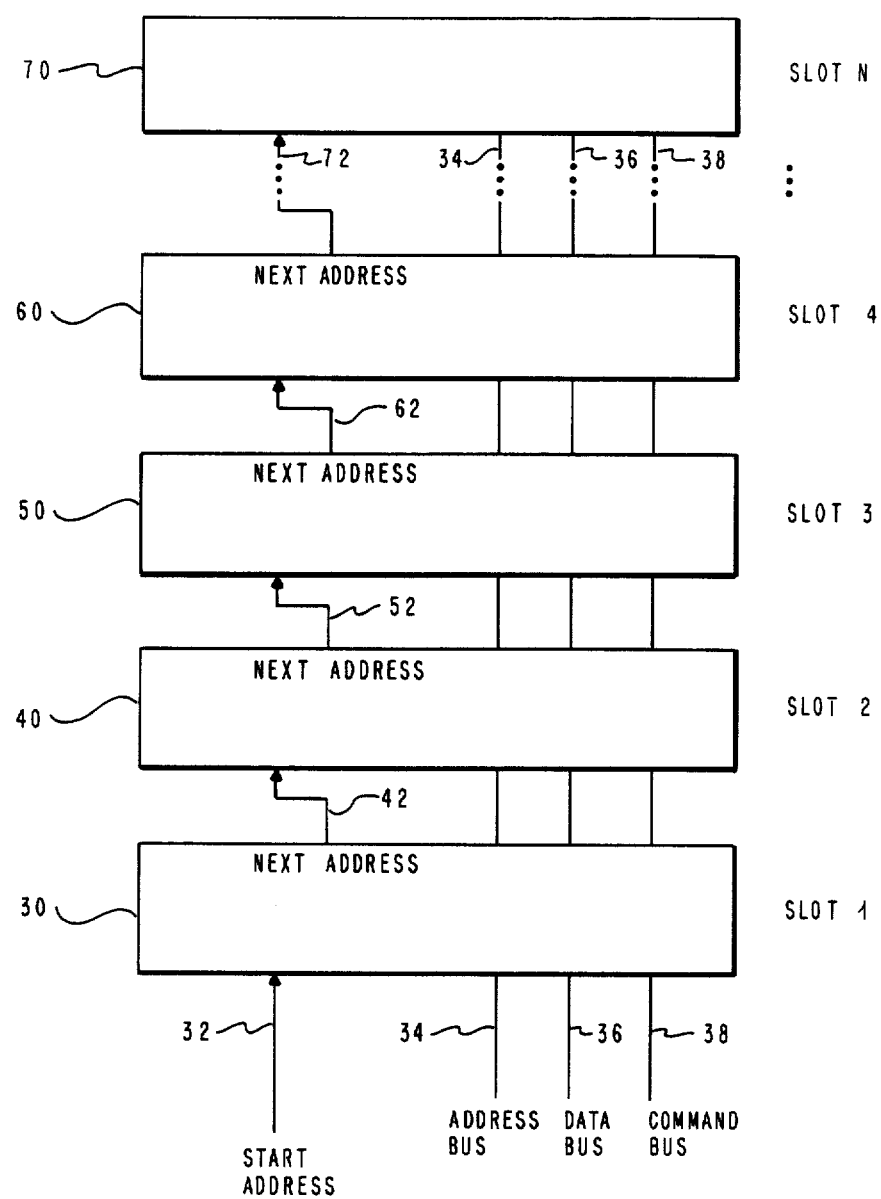
FIG. 2 is a block diagram of serially located memory module slots.

The purpose of the present invention is to, upon initial power load, allocate addresses to individual memory modules in order to provide an overall contiguous address space. FIGS. 1 and 2 illustrate one embodiment of this present invention. FIG. 1 is a block diagram of an individual memory card 10 which includes memory array 11 connected to a data bus 8 and a memory array address bus 25. The start address for the memory module is provided on line 18 to an adder 16. Adder 16 combines the memory card capacity from block 12 on line 14 with the start address to compute the next start address for the next serially located memory card. The next start address is output on line 20 to the next serially located card (not shown). The next start address is also provided by a line 21 to the address compare logic 24. The address compare logic also receives the start address on line 18 and determines the address space for the specific memory card 10. This address space is defined to include the start address and all addresses up to, but not including, the next start address. This address space is then compared with the address available on the address bus 27 to determine when a card select signal 26 is to be provided wherein the memory array address on line 25 is provided to access memory locations in memory array 11. Control lines such as read/write, etc., are also provided but not shown. The memory card capacity block 12 can be a read-only memory, a set of jumpers, a dual-in-line switch or any circuit elements to provide a number representative of the memory card capacity. If a dual-in-line switch or jumpers are provided, the number of switch positions or jumper positions should be sufficient in order that the memory card capacity can be easily updated if the size of the memory array 11 is increased.

FIG. 2 illustrates the position and interconnections of the memory card slots, 30, 40, 50, 60, and 70. Each of these slots 30, 40, 50, 60, and 70 is connected to the address bus 34, the data bus 36 and the command bus 38. Additionally, slot 1 (30) is connected to receive a start address on line 32. In this embodiment, the start address is provided by the processor card (not shown). If memory is located on the processor card, the start address would be the next available address after the addresses have been allocated to the processor memory. This start address information is processed by the memory card in slot 30 to provide a next address on line 42 to the next sequentially located card in slot 2 (connector 40) as discussed. The memory card 40 in slot 2 then provides the next address on line 52 to the memory card 50 in slot 3 and so forth for the populated slots. In this manner, the start addresses for the memory cards will be allocated in a daisy chain fashion providing a contiguous address space for these cards. This address space is contiguous even though the cards themselves in these slots may be of varied memory capacity.

It should be apparent from FIG. 2 that any number of slots may be implemented. Each of the slots should be connected to the common address bus 34, data bus 36 and command bus 38 while having the next address lines connected in a daisy chain fashion as illustrated in FIG. 2. It should be apparent to those skilled in the art that the start address on line 32, 42, 52, 62, and 72 together with the address bus 34, data bus 36, and command bus 38 may include either serial or parallel lines.

Figure 3:
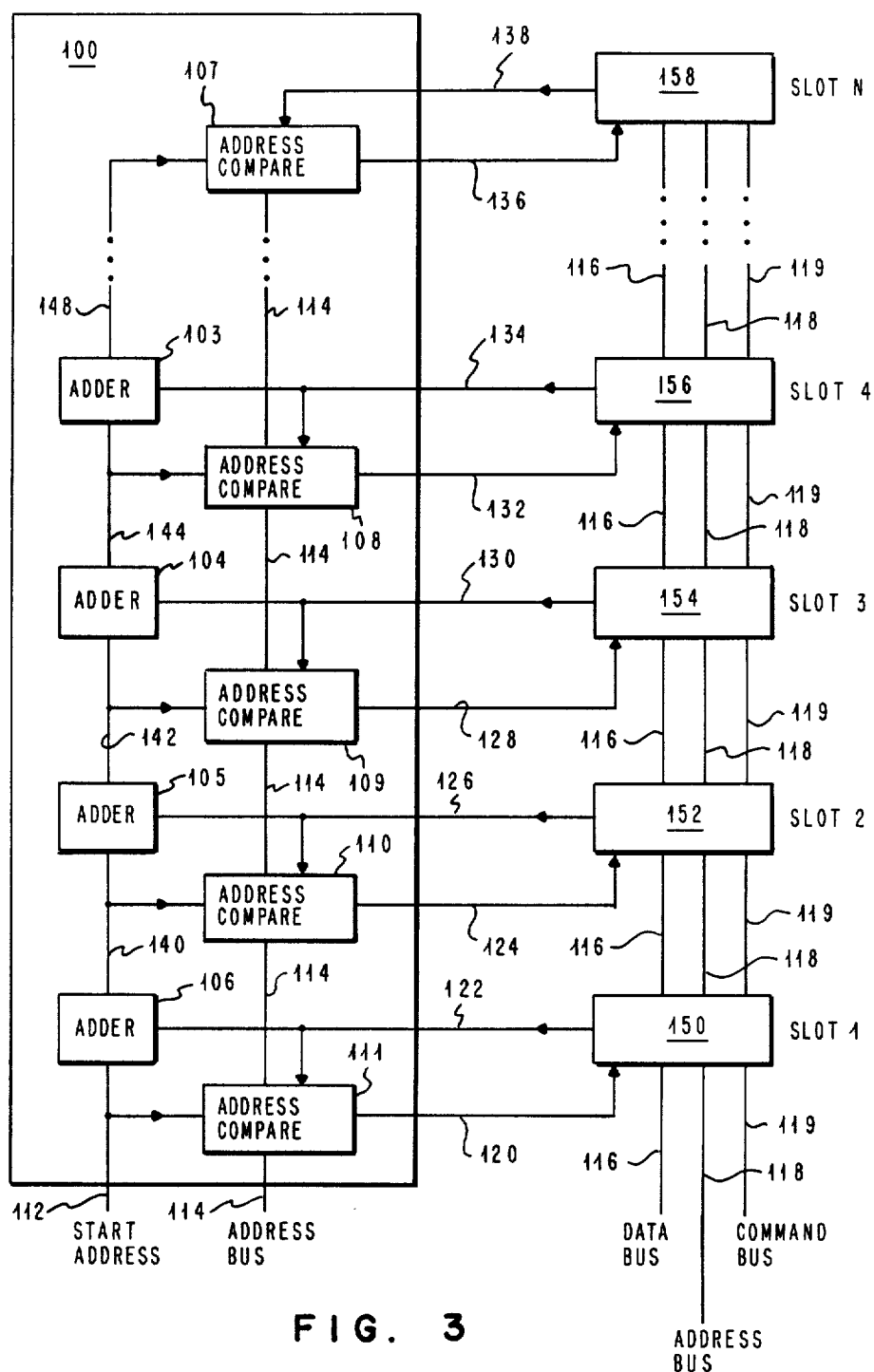
FIG. 3 is a block diagram of a memory control circuit connected to serially located memory card slots.

FIG. 3 illustrates a second embodiment of the present invention that includes a memory controller 100 located upon the processor card or some other central location. The memory controller 100 includes several adders 102 through 106 and several address compare circuits 107 through 111. The memory card slots, slot 1 through N including connectors 150, 152, 154, 156, and 158 are connected to a data bus 116, an address bus 118, and a command bus 119 that each are respectively common to all of the connectors 150, 152, 154, 156 and 158. Additionally, each of the connectors 150, 152, 154, 156, and 158 is individually connected to an adder and an address compare circuit of the memory controller 100.

Referring now to the memory controller 100, an initial start address is provided on line 112 to adder 106. As before, the initial start address originates from the processor board. This start address on line 112 is combined with the memory capacity on line 122 originating from connector 150 connected to the memory card in slot 1. The memory capacity on line 122 and the start address on line 112 are added together in adder 106 to provide the next address on line 140 to adder 105. The memory capacity on line 122 and start address on line 112 is also provided to the address compare circuit 111 to enable the address compare circuit 111 to determine the address space for its respective memory module located in slot 1. The high order address lines on line 114 are provided to the address compare logic 111 to enable the address compare logic to determine if the memory module is being accessed. If the memory module is being accessed, a module select signal on line 120 is provided to connector 150 to signal the memory module in slot 1 to receive the low order address on line 118 to access a memory location on the memory module.

The next address on line 140, provided to adder 105, is converted in a similar manner using the memory capacity data on line 126 to provide a next address on line 142. In this manner, each of the adders 103 through 106 will each receive a respective start address and a memory capacity. Adder 103 will output a next start address to the address compare circuit 107 for the last located slot N including connector 158.

The address compare circuits 107-111 are connected to address bus 114 and individually connected to receive a start address and the memory capacity for their respective memory modules. For example, address compare circuit 111 receives a start address on line 112 and the memory capacity on line 122 to define an address space for the memory module in slot 1. When the appropriate address is received on line 114, the address compare circuit 111 decodes the address and provides a card select signal on line 120 to activate the card in slot 1 to receive the address on line 118 together with data on the data bus 116 and command signals on the command signal hus 119 as appropriate. Each of the address compare circuits 107 through 111 receive the memory capacity from their respective slot connectors to provide the memory address space for their respective memory modules. As should be appreciated by those skilled in the art, by placing the higher order address lines on 114 onto the memory controller 100, the number of address lines to each of the slot connectors 150, 152, 154, 156 and 158 may be reduced. Each of these slot connectors 150, 152, 154, 156 and 158 is required to provide the individual memory capacity lines 122, 126, 130, 134, and 138 to the memory controller 100. Additionally, the connectors 150, 152, 154, 156, and 158 individually receive module select signals on lines 120, 124, 128, 132 and 136 respectively.

The memory control circuit in FIG. 3 provides the advantage that the daisy chain sequence of providing start address to the address compare circuitry for each of the memory modules in the slots is performed on a common circuit board or on a single integrated circuit, reducing the total address lines required for accessing information in the individual memory modules.

Figure 4:
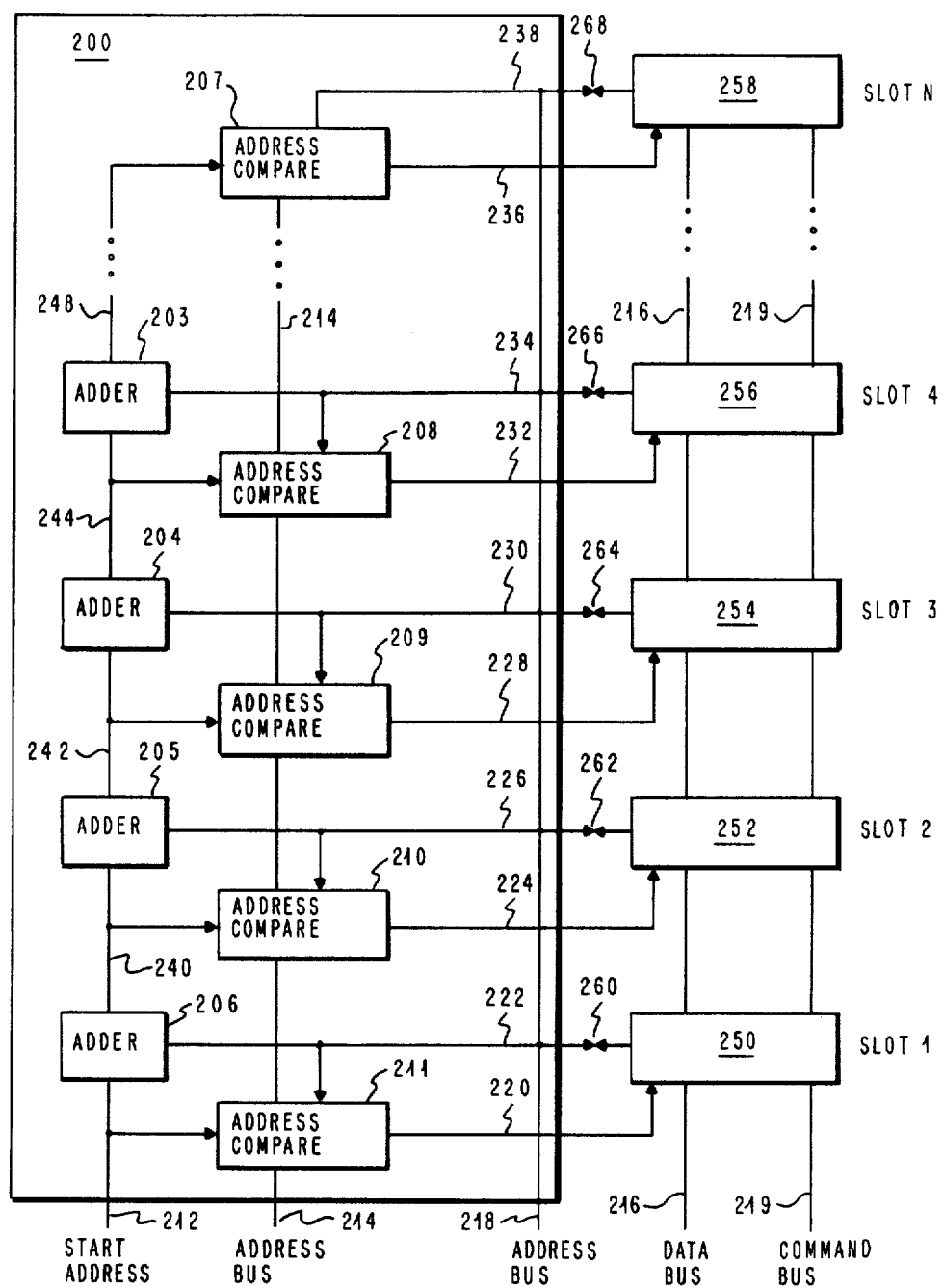
FIG. 4 is a block diagram of another embodiment including a memory controller connected to serially located memory card slots.

FIG. 4 illustrates a third embodiment of the present invention that provides for further reduction of the address bus lines to the memory modules in slots 1 through N as shown. As previously explained, the memory controller 200 includes adders 203 through 206 and address compare circuits 207 through 211 that each operate in a manner similar to their counterparts in FIG. 3. The initial start address is provided on line 212 and the next address is provided in a daisy chain fashion on lines 240, 242, 244, and 248 as shown. Furthermore, the high order address lines are provided to the address compare circuits 207 through 211 on lines 214. The individual address compare circuits 207 through 211 each determine the address space for their respective memory modules by combining the start addresses with the memory capacity. The output of the individual address compare circuits 207 through 211 is the module select signal on lines 220, 224, 228, 232, and 236 to their respective memory modules in slots 1 to N.

The difference in this embodiment is that the data flow on lines 260, 262, 264, 266, and 268 is bi-directional. In this embodiment, these lines are connected to the address bus 218 which contains the lower order bits for the memory locations in the memory modules. By adding a control line on the command bus 219, the direction of lines 260, 262, 264, 266, and 268 may be specified. In this embodiment, the initial direction is from the memory module connectors 250, 252, 254, 256, and 258 to adders 203-206 and address compare circuits 208-211 to provide the memory capacity information on lines 222, 226, 230, 234, and 238 respectively. In a second state, the command signal on command bus 219 reverses the direction of the data flow on lines 260, 262, 264, 266, and 268 to enable the memory in slots 1-N to receive the lower order address of address bus 218. Since the memory capacity data is only required in initialization of the address space, the multiplexing of the address bus 218 with the memory capacity information on lines 222, 226, 230, 234, and 238 will not impact the access timing of the memory modules in slots I through N.

While the invention has been particularly shown and described with reference to preferred embodiments, it will be understood by those skilled in the art that various other changes in form and detail may be made without departing from the spirit and scope of the invention.

What is claimed is:

1. A memory system providing a contiguous memory address space to a central processing unit connected to the memory system by an information bus for the transfer of address and data information, said memory system comprising:
 a plurality of removable memory modules connected in series to the information bus for sending and receiving data information and a first portion of address information, each module including means for providing module memory capacity and first decoder means for receiving a module select signal and for receiving said a first portion of address information and providing access to memory locations therein in response to said first portion of address information and the reception of said module select signal; and
 control means for receiving a start address from the central processing unit and connected to the information bus for receiving and sending data information and the remaining portion of address information from said central processing unit and connected to each memory module for receiving the memory module capacity from each memory module, said control means for allocating address ranges for each of the memory modules and for sending the module select signal to an individual one of said memory modules when the remaining portion of addressed information received is within the address range allocated for the individual one of said memory modules.

2. A memory system according to claim 1 wherein said control means includes adder means for adding the start address to the memory capacity of a memory module to compute the module address range and a next serially connected memory module start address.

3. A memory system according to claim 1 wherein said information bus includes a plurality of parallel address lines, including high to low ordered parallel bit lines, for the transfer of address information, the first portion of address information lines being a low ordered plurality of said address lines and the remaining portion of address information lines being a high ordered plurality of the remaining address lines.

4. A memory system for providing a contiguous memory address space, said memory system connected to a central processing unit by an information bus for the transfer of address and data information, said information bus including a data bus and an address bus having a high to low ordered plurality of parallel bit lines, said memory system comprising:
 a plurality of removable memory modules connected in series to the data bus and a low ordered portion of said addresss bus bit lines, each module including:
  (i) memory means for the storage of data according to a low ordered address;
  (ii) means for providing memory module storage capacity;
  (iii) low order address decode means for decoding a low order address from the low ordered portion of address bus bit lines upon the occurrence of a memory module select signal and for sending or receiving data on the data bus corresponding to the low ordered address on the address bus and in response thereto; and
 a memory controller remotely located from the memory modules and including a plurality of adder means connected in series and high order address decode means corresponding to an individual one of said memory modules, each adder means connected to receive from each memory module said memory capacity corresponding memory module and for receiving a memory module start address from the central processing unit or a next start address from a preceding serially located adder means and for computing an address range for the memory module and a next start address for the next serially connected memory module and adder means, the high order address decode means connected to its adder means to receive the memory module address range and connected to the high ordered portion of the address bus, said high order address decode means for receiving address data from the high ordered portion of the address bus and providing the memory module select signal when the address data is within the address range for its respective memory module.

5. A memory system according to claim 4 wherein the adder means for computing the next start address for the next serially connected memory and adder means includes means for computing this next start address to be contiguous with the highest address for the computed memory module range.

6. A memory system according to claim 5 wherein the low ordered portion of the address bus bit lines are connected to the means for providing the memory module storage capacity.

7. A memory system according to claim 6 wherein the information bus includes control lines for providing control signals from the central processing unit for controlling the direction of data flow over the low ordered portion of the address bus bit lines providing the low order address and the memory module storage capacity.

* * * * *

UNITED STATES PATENT AND TRADEMARK OFFICE
CERTIFICATE OF CORRECTION

PATENT NO. : 4,740,916

DATED : April 26, 1988

INVENTOR(S) : D. E. Martin

It is certified that error appears in the above-identified patent and that said Letters Patent is hereby corrected as shown below:

Col. 6, line 47, before "corresponding" insert --from its--.

Signed and Sealed this

Tenth Day of September, 1991

Attest:

HARRY F. MANBECK, JR.

Attesting Officer

Commissioner of Patents and Trademarks